United States Patent [19]

Bahder et al.

[11] 4,104,479
[45] Aug. 1, 1978

[54] STOP JOINT FOR LAMINAR DIELECTRIC CABLE

[75] Inventors: George Bahder, Edison; George S. Eager, Jr., Upper Montclair; Attila F. Dima, Piscataway; James J. Walker, Berkeley Heights, all of N.J.

[73] Assignee: General Cable Corporation, Greenwich, Conn.

[21] Appl. No.: 755,029

[22] Filed: Dec. 28, 1976

[51] Int. Cl.² .................................... H02G 15/24
[52] U.S. Cl. ........................ 174/22 R; 174/73 R
[58] Field of Search ............ 174/19, 20, 21 R, 21 C, 174/22 R, 22 C, 23 R, 73 R, 75 D

[56] References Cited

U.S. PATENT DOCUMENTS

| | | | |
|---|---|---|---|
| 2,120,889 | 6/1938 | Emanueli | 174/22 R |
| 2,967,901 | 1/1961 | Priaroggia | 174/22 R X |
| 3,539,706 | 11/1970 | Buroni et al. | 174/75 D |
| 3,551,582 | 12/1970 | Palmieri | 174/19 |

Primary Examiner—Laramie E. Askin
Attorney, Agent, or Firm—Roy C. Hopgood; John M. Calimafde; Charles W. Neill

[57] ABSTRACT

This improved stop joint is used at connections of one length of electric cable to another, for the purpose of preventing fluid in one length of cable from contacting fluid in the next length of cable. The joint includes a stop tube that surrounds the end portion of one length of cable and that is made with a mid-portion of resin base material, preferably reinforced, and end portions of metal connected to the resin base material by fluid-tight connections. These metal end portions are secured to the pipe or shield that surrounds one or both of the lengths of cable. Parts are constructed so as to minimize the time and cost of making the connections between the cable lengths and the connecting of the stop joint with the pipe or shield that surrounds the respective cables.

12 Claims, 3 Drawing Figures

U.S. Patent    Aug. 1, 1978    4,104,479
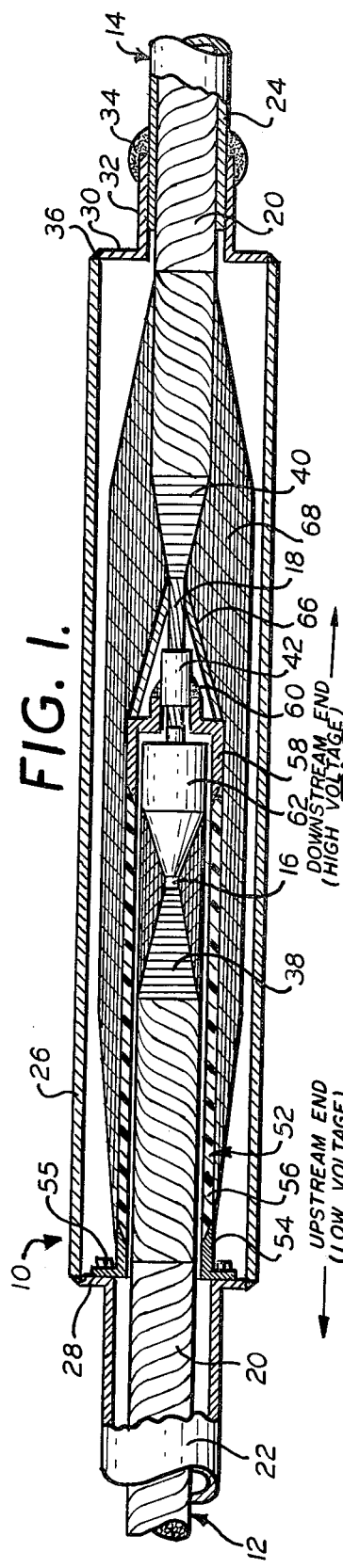
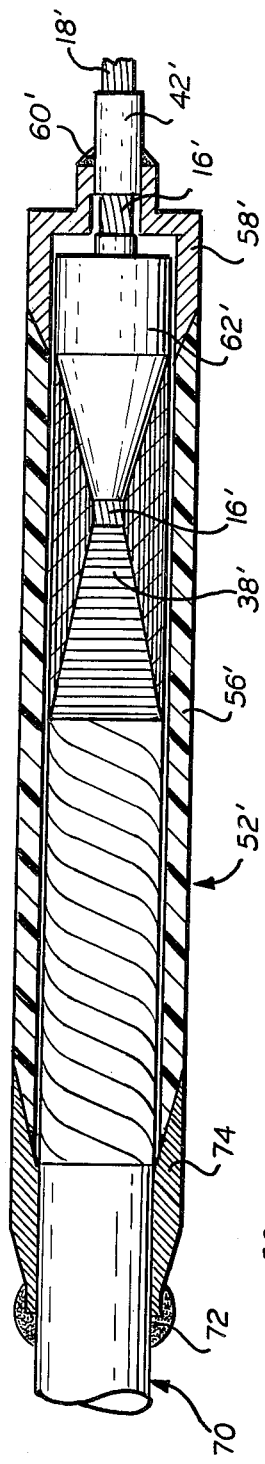
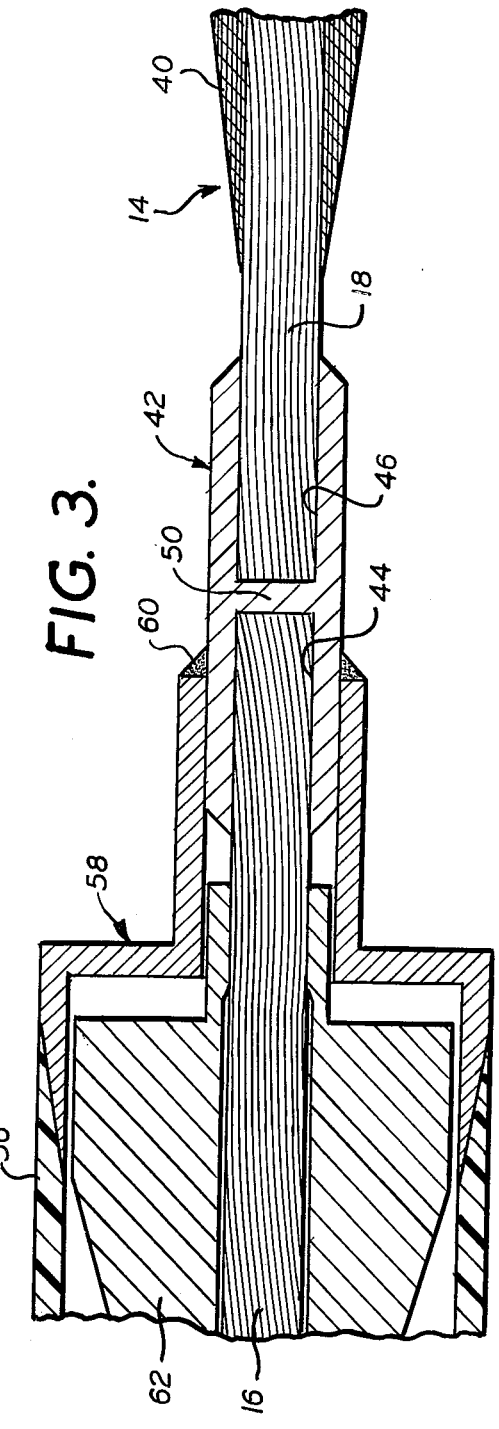

STOP JOINT FOR LAMINAR DIELECTRIC CABLE

BACKGROUND AND SUMMARY OF THE INVENTION

The stop joints provide a mechanical barrier against the oil or other fluid flow from one section of the cable to another or from one type of cable system to another type.

They are commonly used on medium pressure oil filled or low pressure oil filled cables to avoid unsafe high pressure condition when the cable run profile has a large level variation. In such cases the number of stop joints is determined by the permissible hoop stress in the cable sheath.

Stop joints are also used for connecting different cable systems, such as high pressure oil filled, low pressure oil filled cable or gas cables, etc. The stop joints not only have a large variety of applications, but they also have a large variety of designs. The earliest were made of two inverted terminals in a vertical configuration.

Presently, it is a common practice to use stop joints with porcelain or some type of resin barriers. The barriers can be installed between the two cables or pulled over one or both cable ends, this type being called "stop tubes." The most widely used stop tubes are made of porcelain having a conical shape. Less expensive cylindrical type stop tubes are also known, but they are not used as frequently. This unpopularity is due to their bulky connector arrangement, which is required for bringing the high voltage potential to the outer surface of the stop tube. Furthermore, the stress control of this arrangement is not very effective, and the joint construction is delicate.

Although the stop joint of this invention has a cylindrical stop tube, many of the known drawbacks mentioned above are eliminated. The tube is preferably made of a resin base material, preferably reinforced by fiberglass, paper or other suitable materials, having good electrical and mechanical characteristics, at a considerably reduced cost. The two sealing ends are made of metal and they are glued or cast into the resin base tube. Because the ends are active parts of the electrode system, the size of the electrode is greatly reduced.

The high voltage electrode system consists of an inner electrode at the sealing end of the stop tube, and a conical envelope over the connector. The ends of the conductors of both lengths of cable extend into the connector, but on opposite sides of an inner barrier that prevents flow of oil or other fluid.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a sectional view showing a stop joint at a location where two lengths of cable are joined together, one cable length being a pipe cable and the other a self-contained cable;

FIG. 2 is an enlarged sectional view of the stop tube shown in FIG. 1 connected at one end to a self-contained cable; and FIG. 3 is a greatly enlarged sectional view through one end of the stop tube shown in FIGS. 1 and 2, and with the connector between the conductors of the cables shown in section to illustrate the barrier to fluid flow.

DESCRIPTION OF PREFERRED EMBODIMENT

FIG. 1 shows a stop joint 10 located between a first length of cable 12 and a second length of cable 14. Both cables are shown as laminar dielectric cables which have conductors 16 and 18, respectively, insulated with tape which is wrapped in successive overlapping layers, indicated by the reference character 20.

The cable 12 is a pipe-type cable enclosed in a pipe 22 which holds oil in which the cable 20 is immersed. The second cable 14 is a self-contained cable, the core of which is surrounded by a metal shield 24 which prevents escape of oil with which the cable 14 is impregnated.

The conductors 16 and 18 are connected together in the stop joint 10; and the stop joint illustrated in FIG. 1 is constructed for use with different types of cable; that is, pipe-type and self-contained, but it will be understood that stop joints are also used between cables of the same type.

The stop joint has an outer casing 26, usually referred to as the joint casing; and this casing 26 is secured at one end to a flange 28 which is at the end of the pipe 22. The other end of the casing 26 is secured to a flange 30 which has a short length of cylindrical tubing 32 that fits over the sheath 24 and that is connected to the sheath 24 by brazing 34 or in any other suitable manner. The casing 26 is connected with the flanges 28 and 30 by welding 36; but it will be understood that any other kind of fluid-tight connection can be used which has the necessary strength.

Portions of the insulation 20 are removed from the cables 12 and 14 so as to make the insulation become progressively thinner for a portion of the length of the cables; and insulation treated in this manner is commonly referred to as "pencilled". These pencilled portions of the insulation on the cables 12 and 14 are designated in FIG. 1 by the reference characters 38 and 40, respectively.

At the end of the tapered or pencilled sections 38 and 40, the conductors 16 and 18, respectively, are bare.

The bare ends of the conductors 16 and 18 extend into opposite ends of a connector 42. This connector 42 is shown in section on an enlarged scale in FIG. 3. The conductor 16 extends into a socket 44 at one end of the connector and the conductor 18 extends into a socket 46 at the other end. The conductors 16 and 18 fit into the sockets 44 and 46. The connector is pressed onto conductors 16 and 18, but to eliminate all possibility of passage of oil through the connector 42, there is a barrier in the connector consisting of a partition 50 which is preferably of one-piece construction with the rest of the metal connector 42.

Referring again to FIG. 1, there is a stop tube 52 surrounding the portion of the cable 12 which is within the outer casing 26. This stop tube 52 has a flanged end 54 at one end, and the flanged end 54 is connected with the flange of the pipe 22, preferably by screws 55. Most of the length of the stop tube 52, which will be referred to as the "mid-portion" 56, is preferably made of resin and it is connected with the flanged end 54 by strong adhesive or other means which will provide a fluid-tight connection of suitable strength for the stop joint.

At the other end of the mid-portion 56, there is another metal end 58 which corresponds with the flanged end 54, but which extends inwardly and has a cylindrical part that fits around the connector 42 and which is secured to the connector 42 by brazing 60, or in any appropriate manner. The metal end 58 is connected to the resin mid-portion 56 by a strong adhesive connection, as in the case of the flanged end 54.

A metal electrode 62 fits over the bare portion of the conductor 16 between the pencilled section 38 and the connector 42. This electrode 62 has a conical portion which confronts the pencilled section 38 for purposes which will be explained. This electrode 62 is pressed over the conductor 16 and is preferably a press fit on the bare conductor 16.

The connector 42, metal end 58 of the stop tube and the electrode 62 are all at the same potential as the conductor 16, and this end of the stop tube is commonly referred to as the "high voltage" end of the stop tube. The mid-portion 56 insulates the flanged end 54 of the stop tube from the other end, and the end 54 is separated from the conductor by insulation of the cable so that this flanged end of the stop tube is commonly referred to as the "low voltage" end. For purposes of this specification, the high voltage end will be referred to as the downstream end of the stop tube, and the low voltage end as the upstream end, since the construction illustrated in the drawing prevents fluid from flowing from the pipe 22 into the interior of the cable 14. After the electrode 62 has been applied to the conductor 16, the space between the confronting conical faces of the pencilled section 38 and the electrode 62 is wrapped with overlapping layers of insulating tape which may be papered tape and which is ordinarily applied by hand. The cable 12 is then inserted into the stop tube 52, and the connector 42, which is secured to the end of the conductor 16 with a press fit, is inserted through the cylindrical end portion of the metal end 58 and is connected with the metal end 58 by the brazing 60.

A conical envelope 66 extends from the downstream end of the metal end 58 of the stop tube, and this conical envelope encloses the connector 42 and controls the electrical stress and provides a support for insulation 68, which is wrapped in the space between the conical envelope 66 and the pencilled section 40 of the cable 14. This insulation 68 is extended lengthwise of the stop joint so as to cover portions of the cable 14 and also the outside surface of the stop tube 52 for most of its length, as shown in FIG. 1. The purpose of this insulation 68 is to provide adequate insulation, in the outer casing 26, over the downstream (high voltage) end of the stop tube and over the envelope 66 and the bare portion of the conductor 18 in the region of the connector 42.

FIG. 2 shows a larger scale view of the stop tube with its upper end connected to a self-contained cable 70 by a lead-wiping connection 72, or other suitable fluid-tight connection. An upstream metal end 74 of the stop tube is different from the upstream flanged end 54 of FIG. 1, because of the different kind of cable to which the stop tube is connected at its upstream end in FIG. 2.

All other parts in FIG. 2 which correspond to those already described in connection with FIG. 1 are indicated by the same reference characters as in FIG. 1 but with a prime appended.

FIG. 3, which has already been described, is a detailed view of structure shown in FIG. 1, but with some variations in dimensions of parts with respect to one another.

The preferred embodiment of the invention has been illustrated and described, but changes and modifications can be made and some features can be used in different combinations without departing from the invention as defined in the claims.

What is claimed is:

1. A stop joint for laminar dielectric cable including in combination a stop tube placed over an end of a first cable for preventing fluid in the cable from running out of the cable or contacting the fluid in a second cable to which the first cable is connected, a mid-portion of the length of the stop tube being made of resin and having upstream and downstream end portions of the stop tube at the respective ends thereof and secured to opposite ends of the mid-portion of the stop tube, means connecting the upstream end of the stop tube to a shield that surrounds the first cable and that confines fluid in the first cable, a connector joining a conductor of the first cable with a conductor of the second cable, the first cable having insulation thereon and extending through the stop tube and with a bare end of a conductor of the first cable secured to the connector, the insulation being removed from the conductor of the first cable in the stop tube for a substantial distance back from the connector, and an electrode surrounding the first cable and secured thereto along the portion of the conductor from which the insulation has been removed, the electrode diverging from the conductor toward the inside wall of the stop tube as it extends toward the second cable, and means connecting the downstream end of the stop tube to the connector to seal the downstream end of the stop tube.

2. The stop joint described in claim 1 characterized by the connector being made of metal and having sockets in its opposite ends receiving conductors of the cables that are joined together at the stop tube, the sockets being separated from one another by a partition between them that prevents fluid flow from one socket to the next, and the end portions of the stop tube being made of metal and connected with the mid-portion of the tube which is made of resin.

3. The stop joint described in claim 1 characterized by the first cable being a self-contained cable with a sheath around the outside thereof and that constitutes the shield that confines fluid in the first cable, an end portion of the first cable extending through the stop tube, and the upstream end of the stop tube being sealed to the outside of the first cable sheath by a fluid-tight connection.

4. The stop joint described in claim 3 characterized by the stop tube being sealed to the outside of the first cable sheath by a lead wiping.

5. The stop joint described in claim 3 characterized by the means connecting the downstream end of the stop tube to the connector being a brazed connection.

6. The stop joint described in claim 1 characterized by the first cable being a pipe type cable which has an end portion extending through the stop tube, and a flange on the end of a pipe that surrounds the first cable and that holds fluid around the first cable upstream from the stop tube, and the stop tube having a flange that connects with the pipe flange, the flanges being joined together in a fluid-tight seal.

7. The stop joint described in claim 1 characterized by the electrode and the connector being secured to the conductor by press fits.

8. A stop joint for laminar dielectric cable including in combination a stop tube placed over an end of a first cable for preventing fluid in the cable from running out of the cable or contacting the fluid in a second cable to which the first cable is connected, a mid-portion of the length of the stop tube being made of resin and having upstream and downstream end portions of the stop tube at the respective ends thereof and secured to opposite ends of the mid-portion of the stop tube, means connecting the upstream end of the stop tube to a shield that surrounds the first cable and that confines fluid in the first cable, a connector joining a conductor of the first cable with a conductor of the second cable, and means connecting the downstream end of the stop tube to the connector to seal the downstream end of the stop tube, characterized by the first electrical cable extending through the stop tube, insulation on the first cable for a part of the length of the stop tube, the insulation ending at a location spaced from the downstream end of the stop tube, and said insulation tapering to progressively less diameter as it approaches a bare end portion of the conductor of the first cable, the connector having a socket therein into which the bare end of the conductor extends, a conical electrode that surrounds a portion of the bare end of the conductor between the end of the insulation and the connector, the small diameter end of the conical electrode facing the small diameter end of the insulation across a space of progressively increasing length as the space extends outward from the conductor, and wrapped layers of insulation filling said space of progressively increasing length.

9. The stop joint described in claim 8 characterized by the second cable having a conductor which is bare for a portion of its length back from an end thereof, the bare end of the conductor of the second cable being secured to the connector, a conical envelope covering the bare conductor of the second cable for a portion of its length near the connector, the conical envelope decreasing in diameter in the direction of its length as it extends away from the connector, the second cable having its insulation tapering to progressively less diameter as it approaches the small diameter end of the conical envelope, and other wrapped layers of insulation filling the space around the conductor of the second cable and between the conical envelope and the tapered insulation on the second cable, a portion of the other wrapped layers of insulation extending outward to the full diameter of the second cable and the full diameter of the stop tube, and also extending over the stop tube and over the full diameter of the insulation of the second cable, and a casing extending for substantially the full length of the stop tube and beyond the stop tube and over a portion of the second cable having full diameter insulation thereon and which is surrounded by a shield that maintains a fluid medium around the second cable, the casing being connected at its opposite ends to shields of both cables with a fluid-tight connection.

10. The stop joint described in claim 8 characterized by said wrapped layers of insulation being an insulating paper tape.

11. A stop joint located between ends of different lengths of cable that are connected together including in combination a stop tube connected fluid-tight at its upstream end with a shield that surrounds a cable for confining a fluid around the cable core, an inner electrode surrounding a bare end of a conductor of the cable that passes through the stop tube, the electrode being adjacent to the downstream end of the stop tube, and a connector at the downstream end of the stop tube and into which the conductor of the cable is secured, the connector sealing the downstream end of the stop tube to prevent escape of fluid therefrom, and an inner barrier in the connector to stop fluid flow through the connector.

12. The stop joint described in claim 11 characterized by a conical envelope beyond the downstream end of the stop tube and surrounding a portion of the connector that extends beyond the stop tube for connection with the conductor of a second length of cable.

* * * * *